United States Patent
Koike et al.

(10) Patent No.: US 6,248,421 B1
(45) Date of Patent: Jun. 19, 2001

(54) CERAMIC HONEYCOMB STRUCTURE AND EXTRUSION DIE

(75) Inventors: Kazuhiko Koike; Tomohiko Nakanishi, both of Nishio; Yosiyasu Andou, Nagoya, all of (JP)

(73) Assignees: Nippon Soken, Inc., Nishio; Denso Corporation, Kariya, both of (JP)

( * ) Notice: Subject to any disclaimer, the term of this patent is extended or adjusted under 35 U.S.C. 154(b) by 0 days.

(21) Appl. No.: 09/234,985

(22) Filed: Jan. 22, 1999

(30) Foreign Application Priority Data

Jan. 22, 1998 (JP) .................................................. 10-026738
Dec. 7, 1998 (JP) .................................................. 10-347374

(51) Int. Cl.$^7$ ........................................................ B32B 3/12
(52) U.S. Cl. ........................................... 428/116; 428/118
(58) Field of Search .................................... 128/116, 118

*Primary Examiner*—Francis J. Lorin
(74) *Attorney, Agent, or Firm*—Pillsbury Winthrop LLP

(57) ABSTRACT

A reinforcing layer 4 of nearly a cylindrical shape is formed along the outer circumferential portion of a ceramic honeycomb structure which comprises a cylindrical outer circumferential skin layer 1 and cell walls 2, the reinforcing layer 4 being formed at a position maintaining a one-cell pitch from the outer circumferential skin layer 1 and extending from one end surface of the ceramic honeycomb structure toward the other end surface thereof. The reinforcing layer 4 is integrally formed, of the same material, with the outer circumferential skin layer 1 and the cell walls 2 to reinforce the strength in the circumferential direction. This makes it possible to decrease the thickness of the cell walls 2 to not larger than 100 $\mu$m yet maintaining moldability and resistance to thermal shock.

6 Claims, 11 Drawing Sheets

DIAGONAL LINE

DIAGONAL LINE

DIAGONAL LINE

DIAGONAL LINE

DIAGONAL LINE

CERAMIC HONEYCOMB STRUCTURE AND EXTRUSION DIE

BACKGROUND OF THE INVENTION

1. Field of the Invention

The present invention relates to a ceramic honeycomb structure used as a catalyst carrier in a catalytic converter for cleaning exhaust gases from internal combustion engines and to a die for extruding the honeycomb structure.

2. Description of the Related Art

A ceramic honeycomb structure such as of cordierite has heretofore been used as a catalyst carrier in a catalytic converter for cleaning gases emitted from internal combustion engines such as automobile engines (see, for example, Japanese Examined Patent Publication (Kokoku) No. 61-47135). In recent years, it has been demanded to further decrease the weight and pressure loss of a ceramic honeycomb structure which serves as a catalyst carrier for automotive use, and it has been attempted to decrease the thickness of the cell walls to meet the demand. However, a decrease in the cell wall thickness results in a decrease in the strength of the honeycomb structure which may then be cracked since it can no longer withstand the load when it is being incorporated in a converter. Therefore, it was not possible to decrease the thickness of the cell walls to less than 100 $\mu$m. To prevent a drop in the strength, it can be contrived to either maintain the strength by increasing the density of cordierite that constitutes the honeycomb structure or reinforce the strength relying upon the structure. In order to decrease the thickness by using the same cordierite starting materials as the one traditionally used without changing the coating property of the catalyst, however, it becomes necessary to reinforce the strength relying upon the structure.

As technology for reinforcing the ceramic honeycomb structure, Japanese Unexamined Patent Publication (Kokai) No. 49-88908 discloses a structure for enhancing the strength by forming the outer circumferential skin layer A thicker relative to the cell walls B, as shown in FIG. 1. However, an increase in the thickness of the outer circumferential skin layer A results in a decrease in the moldability of the ceramic honeycomb structure and in the resistance against thermal shock causing the probability of developing cracks due to heat at the time of cleaning exhaust gases. According to a honeycomb structure disclosed in Japanese Unexamined Patent Publication (Kokai) No. 51-155741, the strength is increased by increasing the thickness of the cell walls B' over a range of ±22 degrees in the diagonal directions, as shown in FIG. 2. According to this structure, however, thick portions are formed over increased areas, and the cell walls become thick at the central portions where the exhaust gases flow in large quantities, offsetting the merit of decreasing the thickness of the cell walls.

As described above, according to the conventional structures, it is difficult to maintain the strength of the structure while decreasing the thickness of the cell walls to smaller than 100 $\mu$m without decreasing the moldability or the thermal shock resistance. The object of the present invention is therefore to provide a ceramic honeycomb structure which compensates for a decrease in the strength derived by reduction in thickness of the cell walls, sufficiently withstands the load at the time of being incorporated in a catalytic converter, and exhibits favorable moldability and thermal shock resistance. The invention further provides an extrusion die used for producing the ceramic honeycomb structure.

SUMMARY OF THE INVENTION (1) The ceramic honeycomb structure of the present invention comprises a number of cells extending in the axial direction formed by the partitioning walls inside the outer circumferential skin layer of nearly a cylindrical shape. In the outer circumferential portion close to the outer circumferential skin layer, at least one a reinforcing layer of nearly a cylindrical shape is provided extending from one end surface toward the other end surface. The reinforcing layer, the outer circumferential skin layer and the partitioning walls are made of the same material and made into a unitary body. The thickness of the partitioning walls is not larger than 100 $\mu$m from at least the central portion to the vicinity of the reinforcing layer.

According to the above-mentioned constitution, the reinforcing layer of nearly a cylindrical shape provided inside of the outer circumferential skin layer helps increase in the strength in the circumferential direction to compensate for a decrease in the strength caused by a decrease in the thickness of the partitioning walls which are the cell walls. Furthermore, without reduction of the moldability or thermal shock resistance as in the prior art construction of making the outer circumferential skin layer thick, sufficient merit of decreasing the thickness of the partitioning walls is obtained by making the thickness of the partitioning walls not larger than 100 $\mu$m in the portions where exhaust gases flow in large amounts inside the reinforcing layer. It is thus possible to realize a light weight and low pressure-loss ceramic honeycomb structure which maintains a strength large enough to withstand the load at the time when it is being incorporated in a catalytic converter.

(2) A plural number of reinforcing layers having different diameters are concentrically arranged inside the outer circumferential skin layer. In general, the strength increases with an increase in the number of the reinforcing layers. Therefore, the number of the reinforcing layers and the thickness thereof are suitably selected to provide a required strength.

(3) The partitioning walls along the outer circumferential portion are formed with a larger thickness than the partitioning walls in the other portions. A decrease in the thickness of the partitioning walls causes a defect in the molding such as collapse of cells, which, however, is prevented by increasing the thickness of the partitioning walls in the outer circumferential portion. Besides, since an exhaust gas flows in relatively small amount in the outer circumferential portion, the pressure loss is low.

(4) Preferably, when either the reinforcing layer exists in a single number or in a plural number, the reinforcing layer closest to the outer circumferential skin layer is arranged within a one-cell pitch from the outer circumferential skin layer. This highly contributes to increasing the strength of the ceramic honeycomb structure in the circumferential direction.

(5) It is desired that the reinforcing layer is so formed as will not to pass through the lattice points of the outermost circumference cells within ranges of from −4 degrees to +4 degrees with respect to the radial lines extending from almost a center point of the ceramic honeycomb structure having a circular shape in cross section, toward the directions of diagonal lines of the polygonal cells. Since the reinforcing layer does not pass through the lattice points of the cells within the above-mentioned ranges where cells tend to be collapsed during the molding, the cell walls are supported by the reinforcing layer and the cells are prevented from being collapsed.

(6) More preferably, the reinforcing layer is so formed as will not to pass through the lattice points of the cells two cell-pitches from the outermost circumference, in order to further enhance the effect of preventing the collapse of cells.

(7) An extrusion die, for extrusion-molding the ceramic honeycomb structure of the above-mentioned constitution, comprises an extrusion portion having extrusion grooves in the form of a honeycomb shape and a material-feeding portion provided on the inlet side of the extrusion portion and having many round holes communicated with said extrusion grooves to feed a material, wherein one or more ring-like slits are formed in the outer peripheral portion of the extrusion portion. The thus constituted extrusion die makes it possible to extrusion-mold ceramic honeycomb structures having the constitutions described in (1) to (6) above.

(8) The extrusion grooves along the outer circumferential edge of the extrusion portion have a width wider than that of any other portions. The thus constituted extrusion die makes it possible to extrusion-mold the ceramic honeycomb structure of the constitution described in (3) above.

BRIEF DESCRIPTION OF THE DRAWINGS

FIGS. 6A and 6B are diagrams illustrating, on an enlarged scale, a portion of the ceramic honeycomb structure for explaining the effect depending upon the position of the reinforcing layer, wherein FIG. 6A is view of when the reinforcing layer passes through the central portions of the cell walls, and FIG. 6B is a view when the reinforcing layer passes through the lattice points;

FIGS. 7A to 7C are sectional views illustrating the whole ceramic honeycomb structure for explaining the position of the reinforcing layer, wherein FIG. 7A is a view when the cells are of a square shape, FIG. 7B is a view when the cells are of a hexagonal shape, and FIG. 7C is a view illustrating a portion of FIG. 7A on an enlarged scale;

DESCRIPTION OF THE PREFERRED EMBODIMENTS

Figure 1:
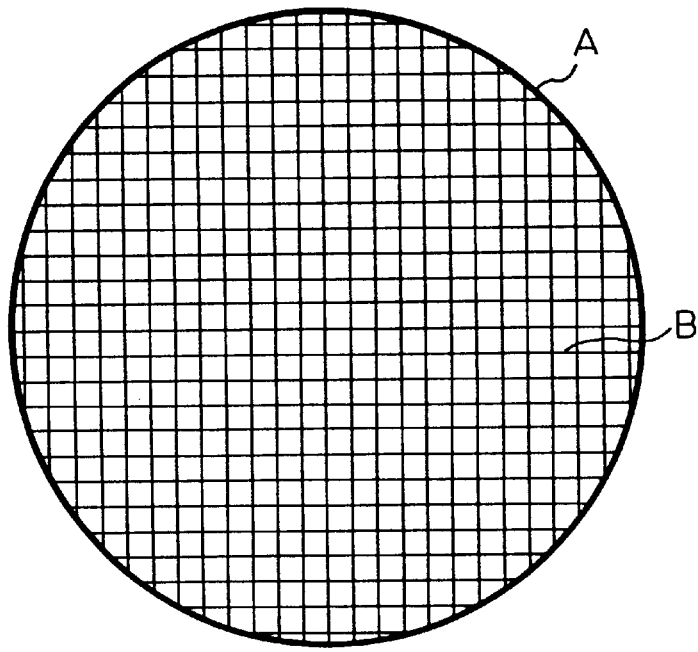
FIGS. 1 and 2 are sectional views illustrating a conventional ceramic honeycomb structure.
Figure 2:
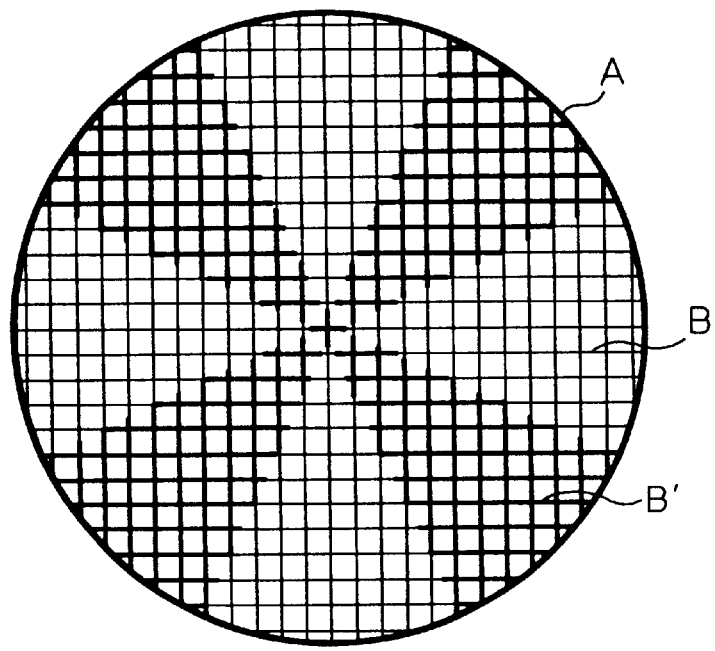
Figure 3:
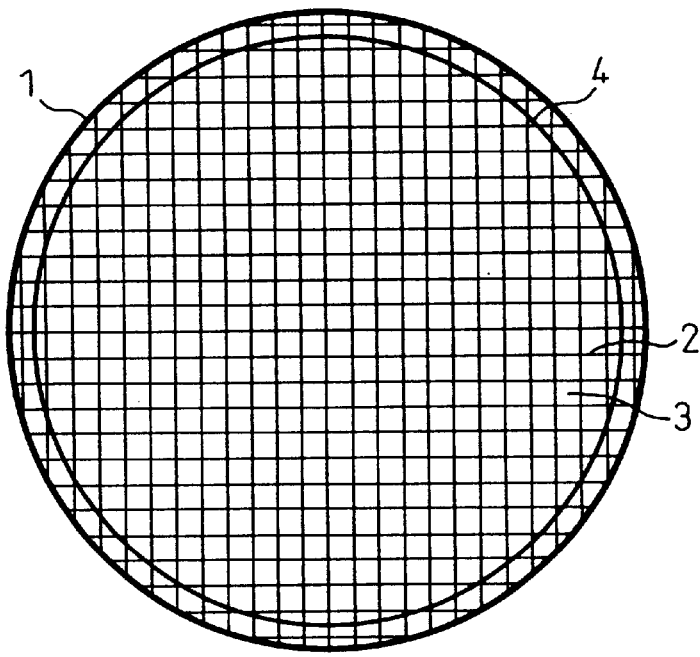
FIG. 3 is a sectional view of a ceramic honeycomb structure according to a first embodiment of the present invention.

The invention will now be described in detail with reference to the drawings. FIG. 3 is a sectional view illustrating a ceramic honeycomb structure according to a first embodiment of the present invention, wherein the interior of an outer circumferential skin layer 1 of a cylindrical shape is sectioned in the axial direction by cell walls 2 or the partitioning walls thereby to form a number of cells 3 extending in the axial direction. The cells 3 may have a polygonal shape such as a rectangular shape, a hexagonal shape or any other shape in addition to a square shape that is shown. The outer circumferential skin layer 1 may not necessarily be of a true circular shape but may have any shape close thereto.

In the present invention, a reinforcing layer 4 is provided concentrically near the inner periphery of the outer circumferential skin layer 1 to extend from one end surface of the honeycomb structure to the other end surface thereof, in order to increase the strength in the circumferential direction. As a result, it is made possible to decrease the thickness of the cell walls 2 to not larger than 100 $\mu$m. The reinforcing layer 4 is integrally made of the same material as the outer circumferential skin layer 1 and the cell walls 2. Cordierite is preferably used as a ceramic material. A greater effect is expected when the reinforcing layer 4 is provided close to the outer circumference as much as possible. Desirably, the reinforcing layer 4 is arranged within a one-cell pitch from the outer circumferential skin layer 1. The thickness of the reinforcing layer 4 is preferably larger than the thickness of the cell walls of a portion where the reinforcing layer 4 is formed but is smaller than the thickness of the outer circumferential skin layer 1. Within this range, the thickness of the reinforcing layer 4 is suitably selected depending upon a required strength. When the thicknesses of the outer circumferential skin layer 1 and of the reinforcing layer 4 become too large, the moldability is lowered. To prevent this, the thicknesses are preferably selected to be not larger than 1 mm.

Figure 4:
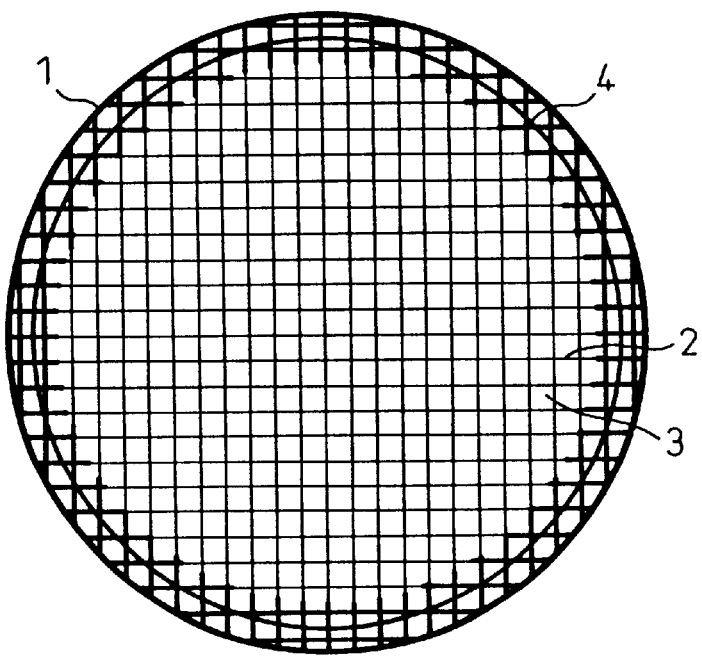
FIG. 4 is a sectional view of a ceramic honeycomb structure according to a second embodiment of the present invention.

FIG. 4 illustrates a second embodiment of the present invention. A decrease in the thickness of the cell walls invites the occurrence of molding defect such as a collapse of cells near the outer circumference due to the force that acts toward the center of the honeycomb structure at the time when the outer circumferential skin layer 1 is formed. A collapse of the cells causes the strength of the honeycomb structure to be greatly decreased. According to this embodiment, therefore, the cell walls 2 along the outer circumferential edge of the ceramic honeycomb structure have a thickness larger than that at the central portion in addition to the constitution of FIG. 3, in order to prevent the cells from being collapsed. Here, there is no particular limitation on the region where the thickness is increased. When there is only one reinforcing layer, it is desired to increase the thickness of the cell walls 2 not only between the outer circumferential skin layer 1 and the reinforcing layer 4 but also near the inner circumference of the reinforcing layer 4. This is because when the thickness of the cell walls 2 greatly differs depending upon the inside and the outside of the reinforcing layer 4, stress tends to be concentrated in these portions. This is prevented by increasing the thickness of the cell walls 2 along the inner circumference of the reinforcing layer 4. The thickness of the cell walls 2 in the portions where the thickness is to be increased lies within a range of not greater than the thicknesses of the outer circumferential skin layer 1 and the reinforcing layer 4, and is suitably selected depending upon a required strength.

Figure 5A:
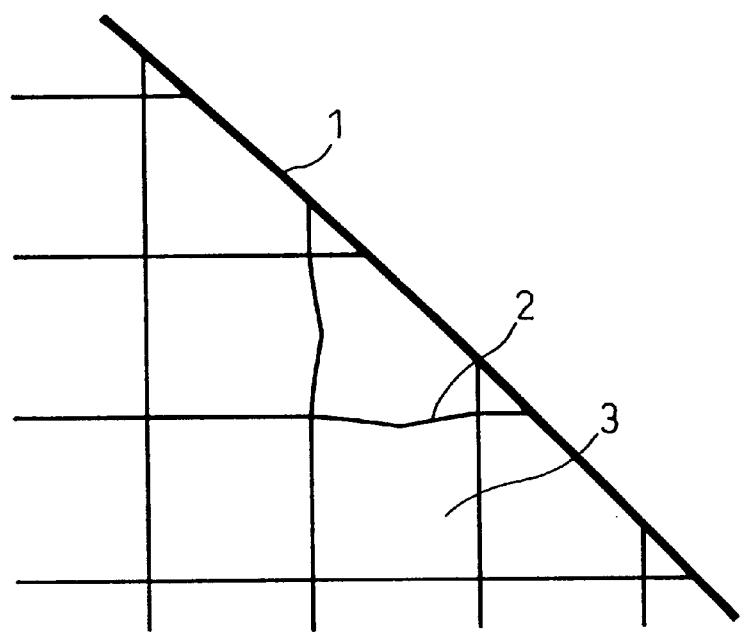
FIG. 5A is a sectional view illustrating, on an enlarged scale, a portion of the ceramic honeycomb structure wherein the cells are collapsed.
Figure 5B:
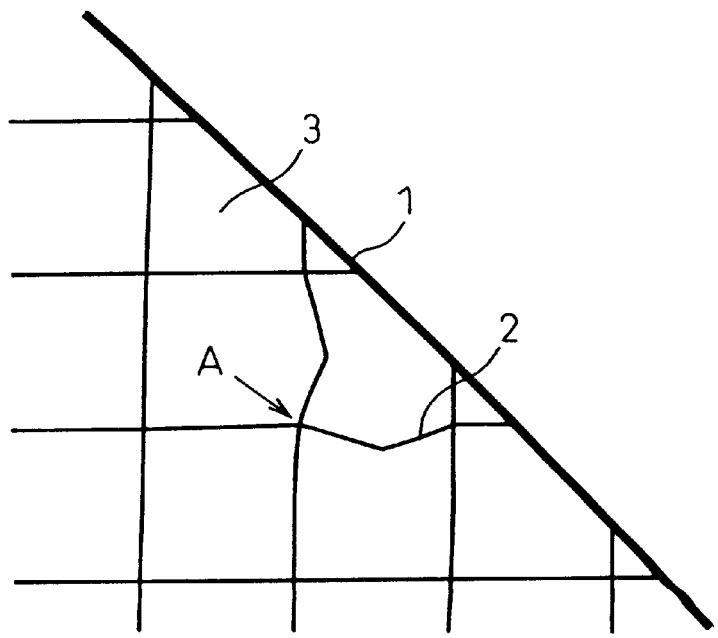
FIG. 5B is a sectional view illustrating, on an enlarges scale, a portion of a deformed state of the ceramic honeycomb structure when the isostatic strength is evaluated.

Next, studied below is an optimum position for forming the reinforcing layer 4. FIG. 5A illustrates a state where the cells have collapsed, that often happens when the honeycomb structure is being molded. When the cells have a square shape, as shown, it was revealed that the cells are most likely to be collapsed in the outermost circumferential portion in the directions of diagonals of the square cells, particularly, within ranges of from −4 degrees to +4 degrees relative to the diagonal lines. When the cells have collapsed, the isostatic strength of the honeycomb structure decreases as described below. FIG. 5B is a diagram illustrating a deformed state of the honeycomb structure of FIG. 5A at the time when the isostatic strength is being evaluated. It is seen that the cells are so deformed that two cell walls 2 of the collapsed cell are turned clockwise around the lattice point (point A) formed by the two cell walls. A tensile stress thus occurs in the cell walls 2 of the collapsed cell, leading to the breakage.

Figure 6A:
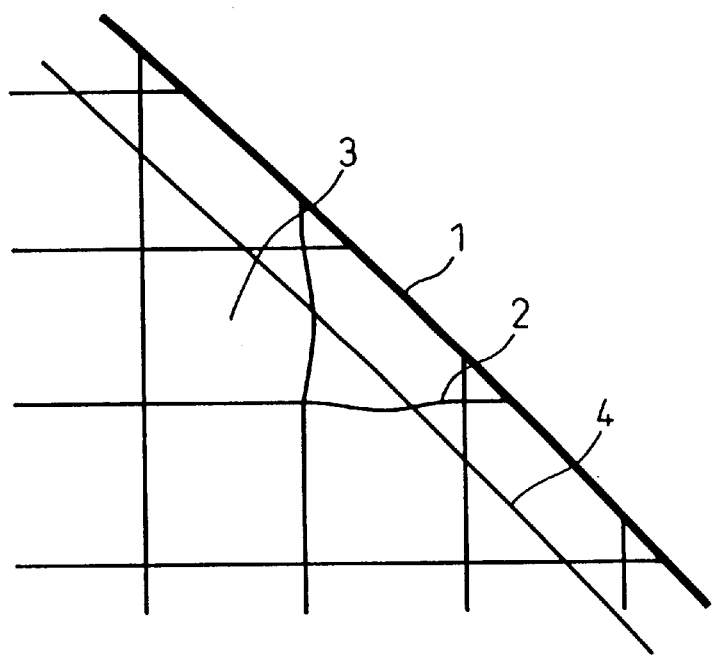
Figure 6B:
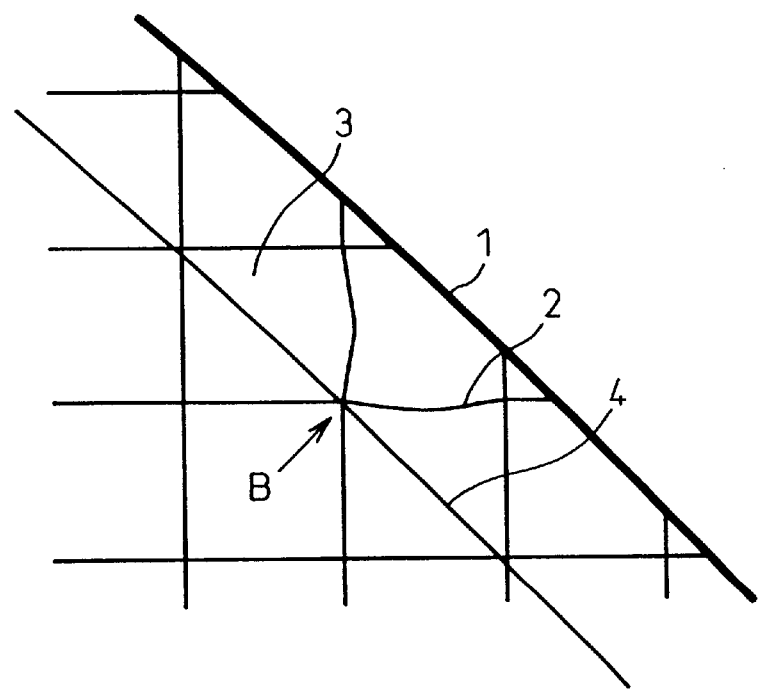

Therefore, the effects against the collapse of cells were compared depending upon where the reinforcing layer 4 was formed so as to pass through the central portions of the cell walls 2 of the collapsed cells (FIG. 6A) and when the reinforcing layer 4 was formed so as to pass through the lattice points (points B in FIG. 6B) of the cell walls 2 of the collapsed cells (FIG. 6B). The reinforcing layer 4 that is formed so as to pass through the central portions of the cell walls 2 as shown in FIG. 6A, supports the cell walls 2 of the collapsed cells from being deformed by the external force. Therefore, a decreased tensile force occurs in the cell walls 2 of the collapsed cells compared with that of the honeycomb structure without reinforcing layer of FIG. 5A. Accordingly, the isostatic strength of the honeycomb structure increases. The above-mentioned effect, however, is not obtained when the reinforcing layer 4 passes through the lattice points of the cell walls 2 of the collapsed cells as shown in FIG. 6B. In the honeycomb structure of FIG. 5A without a reinforcing layer, deformation spreads up to the peripheral portions of the collapsed cells 3, and a stress that is generated is relaxed. However, the reinforcing layer 4 passing through the lattice points suppresses the deformation in the periphery. Therefore, a generated stress is concentrated near the lattice points (points B in FIG. 6B), causing the isostatic strength to be lower than when there is no reinforcing layer.

In order to increase the strength in the circumferential direction, it is desired that the reinforcing layer 4 is formed at a position within a one-cell pitch on the inside of the outer circumferential skin layer 1. The honeycomb structure having square cells exhibits the least durability against the external pressure from the directions of diagonal lines (directions of 45 degrees) of the square cells. In the case of square cells, therefore, it is desired that the reinforcing layer is formed so that it will not pass through the lattice points of the cells of the outermost circumference or, preferably, not pass through the lattice points of the cells in two cell-pitches within ranges of from −4 degrees to +4 degrees with respect to the diagonal lines (directions of 45 degrees) from almost the center point of the cross section of the honeycomb structure. FIG. 7C is a diagram illustrating, on an enlarged scale, the vicinity of the outer circumference. In FIG. 7C, reference numeral 1 denotes the outer circumferential skin layer, 2 denotes the cell partitioning walls, 3 denotes cells, and B denotes lattice points like in FIGS. 6A and 6B. In FIG. 7C, furthermore, X denotes central diagonal lines, Y denotes ±4° radius lines, 3' denotes cells of the outermost circumference, and B' denotes lattice points of the outermost circumference. When the cells have, for example, a hexagonal shape in cross section, it is desired that the reinforcing layer is formed so that it will not pass through the lattice points of the cells of the outermost circumference or, preferably, not pass through the lattice points of the cells of two cell-pitches from the outermost circumferential skin layer within ranges of from −4 degrees to +4 degrees with respect to the radius lines in the directions of diagonal lines from almost the center point of the honeycomb structure. This makes it possible to prevent both the collapse of cells and the reduction of strength, while accomplishing a reduction in the weight and a decrease in the pressure loss.

Figure 7A:
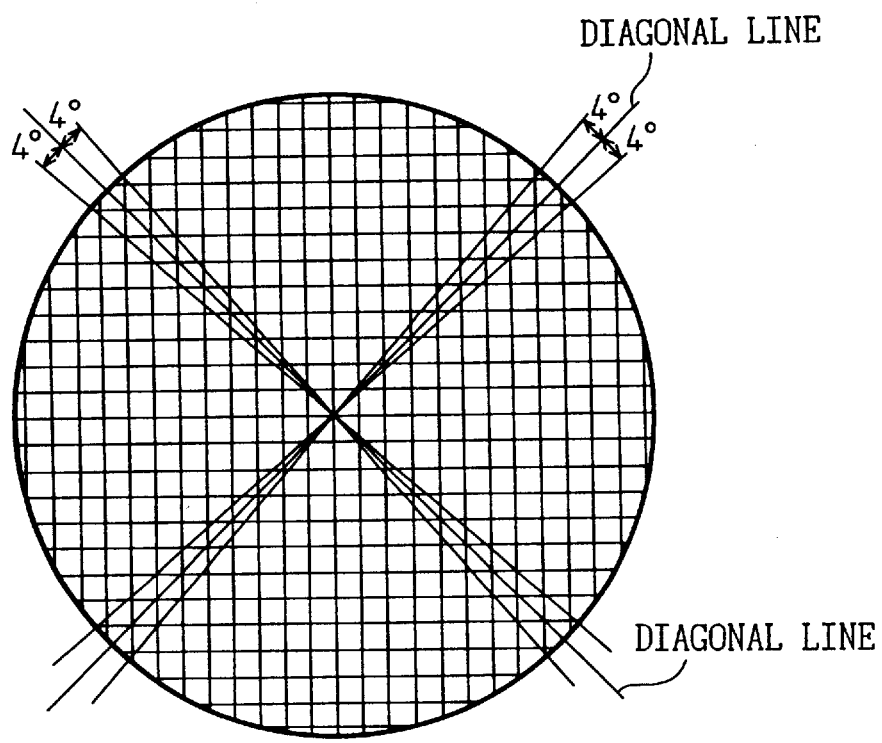
Figure 7B:
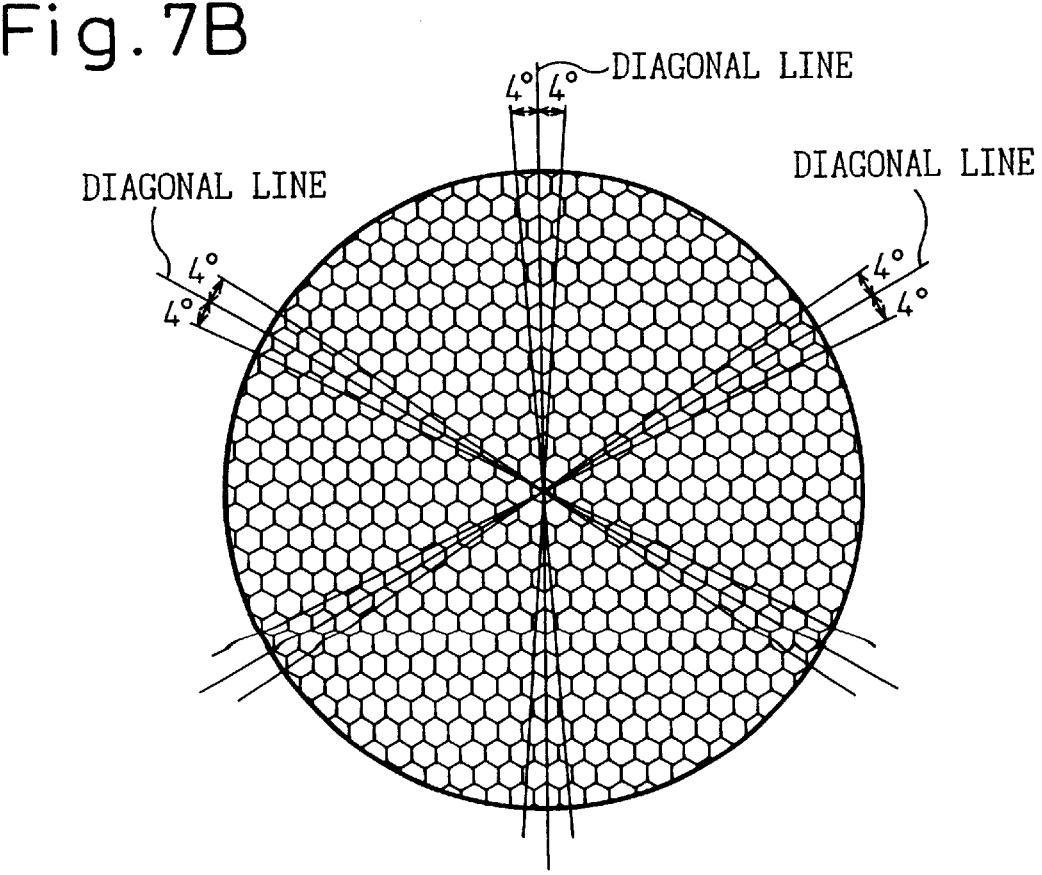
Figure 7C:
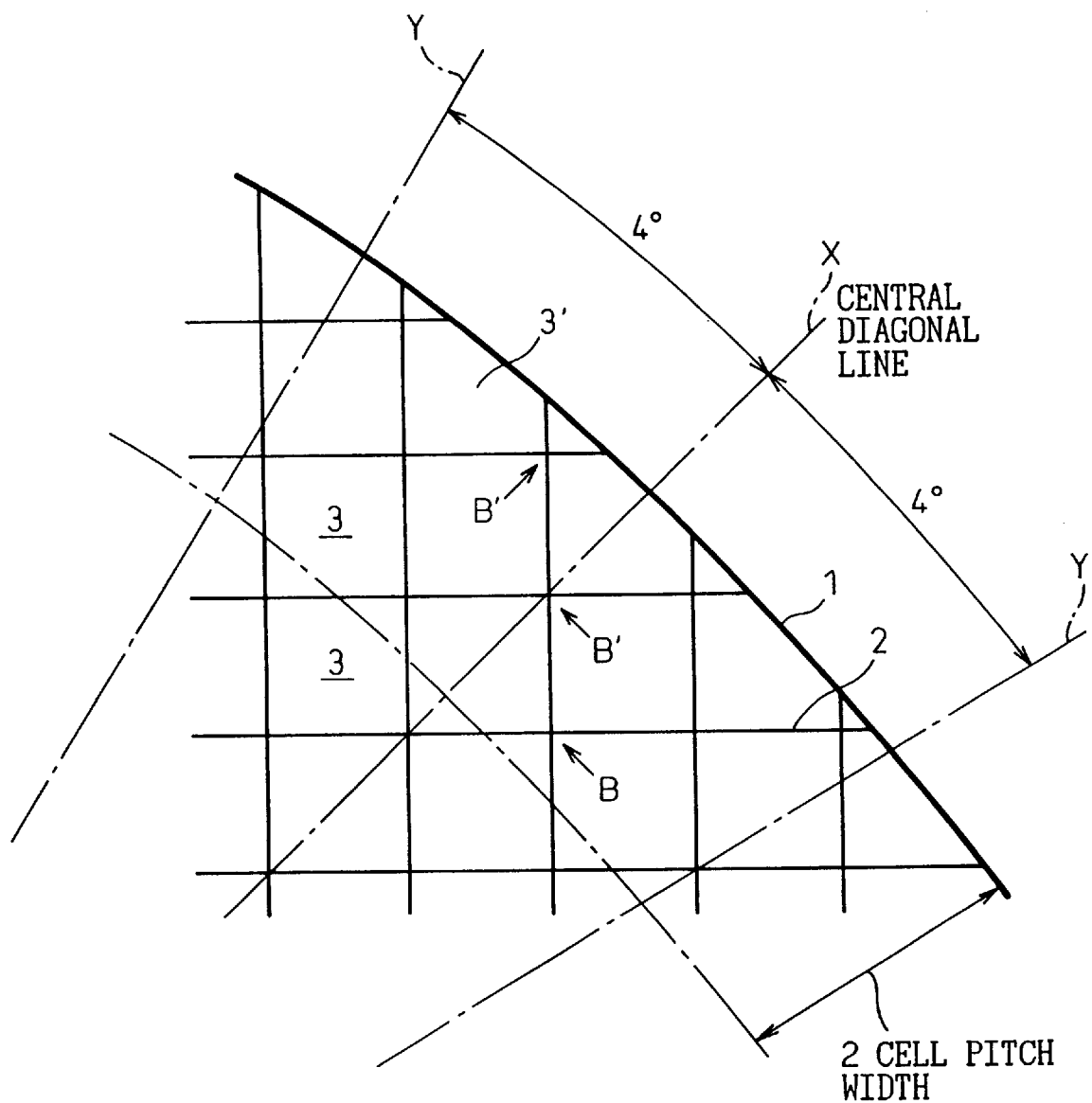

Referring to FIGS. 7A to 7C, the radius lines in the directions of diagonal lines of the central cell stand for straight lines in the radial directions extending from the center of a cell which includes the center of the honeycomb structure toward the directions of diagonal lines.

Figure 8:
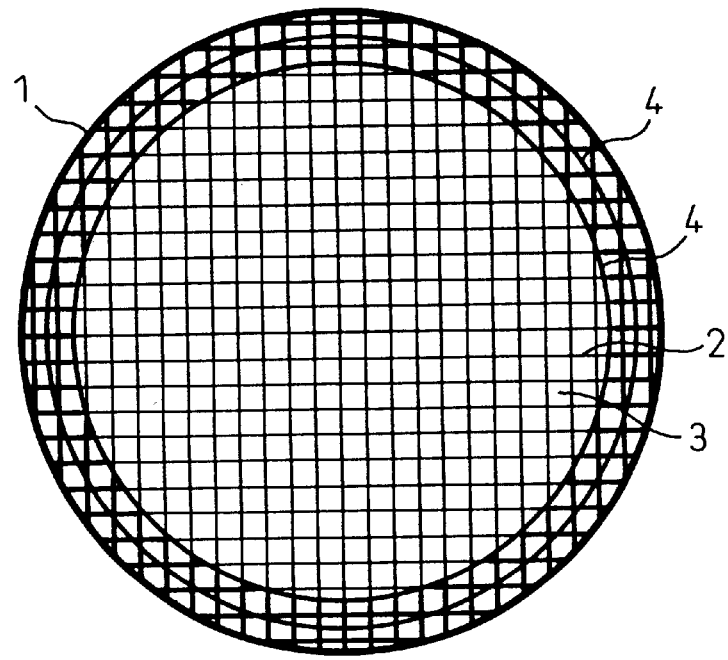
FIG. 8 is a sectional view illustrating a ceramic honeycomb structure according to a third embodiment of the present invention.
Figure 9:
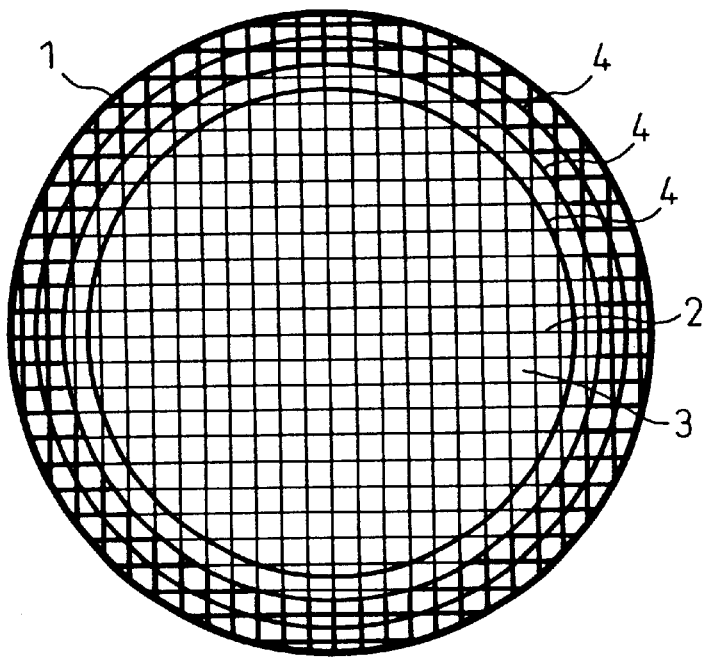
FIG. 9 is a sectional view illustrating a ceramic honeycomb structure according to a fourth embodiment of the present invention.

FIGS. 8 and 9 illustrate third and fourth embodiments of the present invention, wherein FIG. 8 illustrates an embodiment where two reinforcing layers 4 are formed and FIG. 9 illustrate an embodiment where three reinforcing layers 4 are formed. Thus, the reinforcing layers 4 can be formed in a plural number without being limited to only one. It is desired that these plurality of reinforcing layers 4 are formed as close to the outer circumference as possible. In particular, it is desired that the first outermost circumferential layer is arranged within one cell-pitch from the outer circumferential skin layer 1. In this case, too, it is desired that the reinforcing layer 4 is formed so that it will not pass through the lattice points of the cells within predetermined regions where the cells are likely to be collapsed. The thickness of the reinforcing layer 4 is not larger than the thickness of the outer circumferential skin layer 1 but is not smaller than the thickness of the cell walls 2. The second and subsequent reinforcing layers have thicknesses not larger than that of the reinforcing first layer and are formed concentrically therewith maintaining gaps of, for example, one cell-pitch inwards from the outer circumferential skin layer 1. The strength of the structure increases with an increase in the number of the reinforcing layers 4 and with an increase in the thickness thereof. Therefore, the number and thickness of the reinforcing layers 4 may be determined depending upon the required strength. It is desired that the reinforcing layers 4 are formed in a small number. From the standpoint of moldability, however, it is desired that the reinforcing layers 4 have a decreased thickness. It is therefore desired that the optimum number and the optimum thickness of the reinforcing layers 4 are determined in view of these points.

In this case, too, the cell walls 2 are thickly formed near the outer circumference of the structure in order to prevent the cells from being collapsed due to a decrease in the thickness of the cell walls 2. Though there is no particular limitation on the region where the thickness is increased, too great an increase in the thickly formed portions cancels the effect of decreasing the thickness of the overall cell walls. Usually, therefore, the region where the thickness is increased is within several cells from the outer circumferential edge. In the embodiment of FIG. 8 where two reinforcing layers 4 are formed, for example, the cell walls 2 of up to near the outer circumference of the inner reinforcing layer 4 have a thickness larger than those of the central region. In the embodiment of FIG. 9 where three reinforcing layers 4 are formed, the cell walls 2 of up to near the outer circumference of the intermediate reinforcing layer 4 have a thickness larger than those of the central region.

According to the present invention as described above, the reinforcing layers 4 are formed in one layer or in plural layers to increase the strength of the ceramic honeycomb structure in the circumferential direction. It is therefore possible to decrease the thickness of the cell walls 2 to not larger than 100 μm yet maintaining the strength of the structure and, hence, a ceramic honeycomb structure, which is light in weight, has a small pressure loss and withstands the load at the time when it is being assembled in the catalytic converter, is provided. By thickly forming the cell walls 2 along the outer circumferential edge, furthermore, it is possible to prevent collapse of the cells.

Figure 10A:
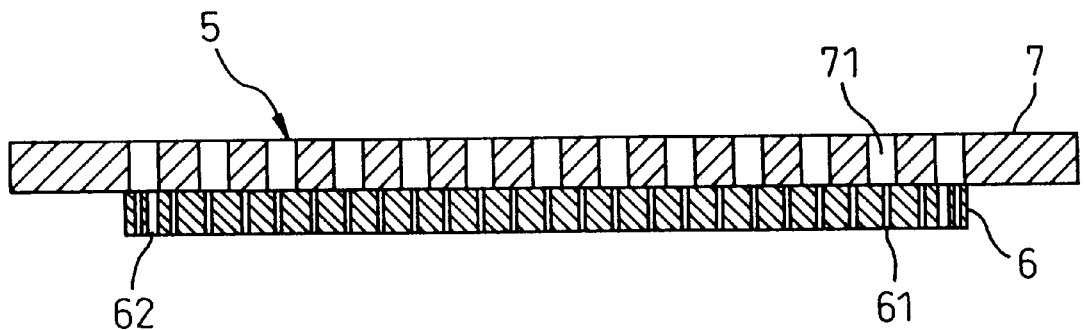
FIG. 10A is a sectional view of an extrusion die along the line A—A in FIG. 10B.
Figure 10B:
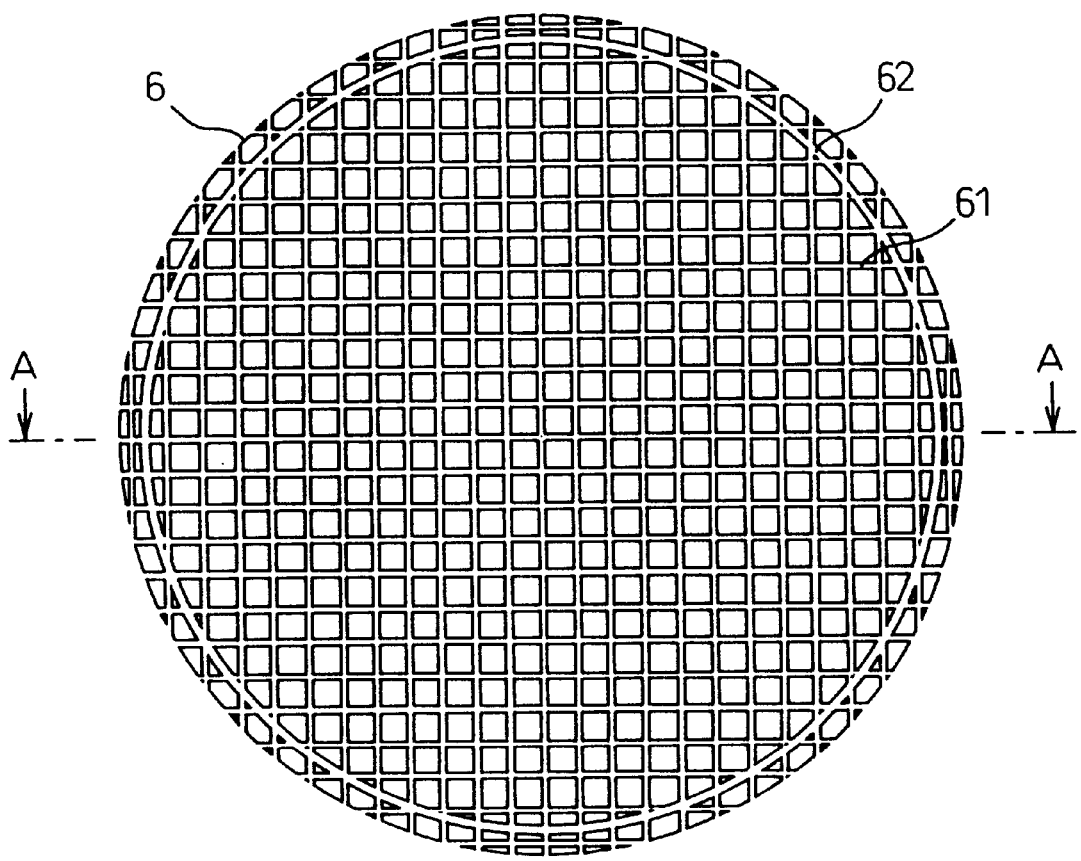
FIG. 10B is a plan view of an extrusion portion.

The above-mentioned ceramic honeycomb structure is produced by mixing and kneading cordierite starting materials, a binder and a lubricant, etc. together to prepare a clay-like composition which is then extrusion-molded. The extrusion molding is effected by using an extrusion die having a slit formed near the outer circumference thereof and corresponding to the reinforcing layer 4. FIGS. 10A and 10B are sectional views of an extrusion die for molding the ceramic honeycomb structure of the first embodiment shown in FIG. 3, which comprises an extrusion unit 6 having extrusion grooves 61, and a material-feeding unit 7 provided thereon and having round holes 71 for feeding the material.

Figure 11:
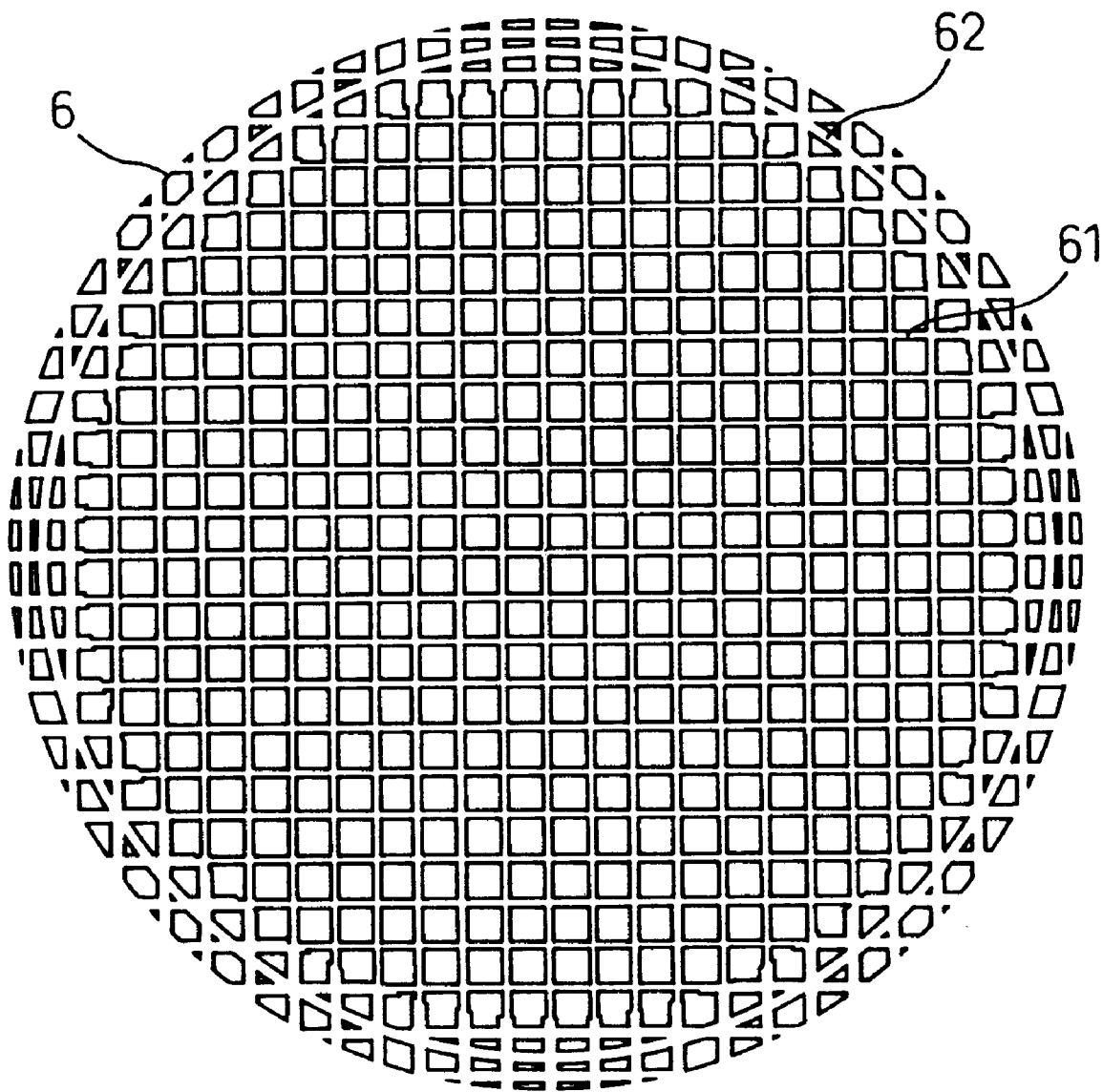
FIG. 11 is a plan view of an extrusion portion illustrating another shape of the extrusion grooves.

The extrusion grooves 61 exist in a large number, have a predetermined width and are arranged of equal distances in the traverse and perpendicular directions in the drawing and communicate with each other. Along the outer circumference of the extrusion unit 6, furthermore, there is formed a ring-like slit 62 having a predetermined width at a position corresponding to the reinforcing layer 4. Here, though only one slit 62 is formed corresponding to FIG. 3, it is possible to suitably change the number, positions and widths of the slits 62 depending upon the shape of the honeycomb structure, as a matter of course. In order to form the ceramic honeycomb structure of the second embodiment shown in FIG. 4, for example, a plurality of ring-like slits 62 are formed in the outer circumferential portion of the extrusion unit 6 as shown in FIG. 11, and the wide extrusion grooves 61 are formed near the outer circumference.

The material feeding unit 7 has a circular circumference and includes many round holes 71 evenly formed over nearly the whole surface excluding the outer circumferential edge. These many round holes 71 are for feeding the honeycomb material into the extrusion grooves 61 positioned on the lower side and are formed at every other intersection of the extrusion grooves 61. Or, these many round holes 71 may be formed at every intersection of the extrusion grooves 61.

There is no particular limitation on the method of machining the thus constituted extrusion die, and various methods can be employed such as grinding, electric discharge machining, etc. For example, after the extrusion grooves 61 are formed by grinding, a ring-like slit 62 is formed by electrical discharge machining. In order to form the thick cell walls 2 along the outer circumferential edge, furthermore, the extrusion grooves in the outer circumferential portion are formed wider by masking the extrusion grooves 61 except those that are desired to be formed wider, and extruding a clay blended with a grinding material therethrough to grind the grooves, so that the width of the grooves is enlarged.

EXAMPLES

In order to confirm the effect of the present invention, a ceramic honeycomb structure was molded under the following conditions. Cordierite starting materials, a binder and a lubricant, etc. were mixed and kneaded together to form a clay-like composition which was then extrusion-molded to prepare a ceramic honeycomb structure having a diameter of 100 mm, a length of 155 mm, a cell wall thickness of 75 μm, a cell pitch of 1.27 mm (square cells), and an outer circumferential skin layer thickness of 0.7 mm.

Figure 12A:
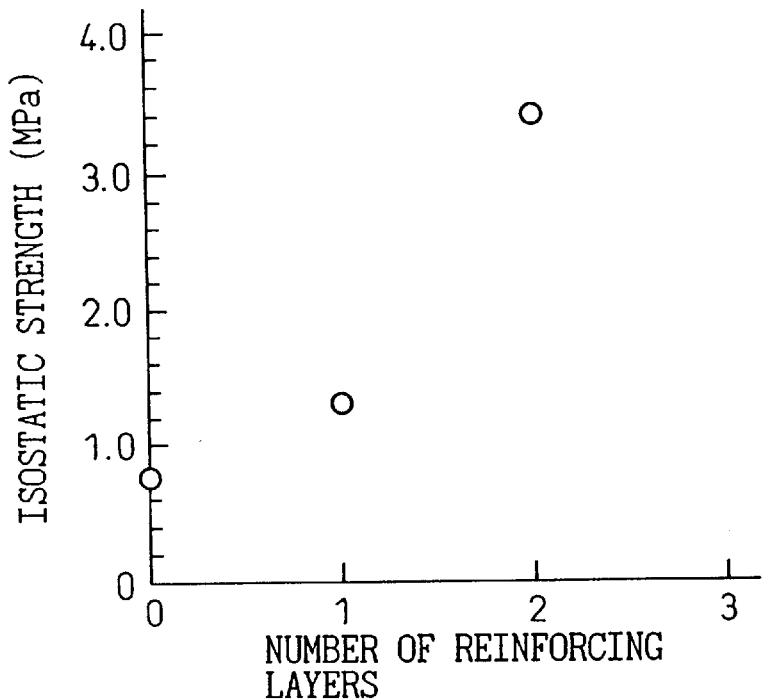
FIG. 12A is a diagram illustrating a relationship between the number of the reinforcing layers and the isostatic strength.

The number of the reinforcing layers (having a thickness of 0.5 mm) formed in the outer circumferential portion was changed, and the isostatic strengths were measured. The results were as shown in FIG. 12A. The reinforcing layers were arranged maintaining one cell-pitch in a manner that the outermost layer was at a position one cell-pitch inside from the outer circumferential skin layer and the second layer was at a position two cell-pitches inside. The outermost reinforcing layer was so formed as will not to pass through the lattice points of the cells of the outermost circumference within ranges of from −4° to +4° with respect to the diagonal lines of the center cell.

Furthermore, in similar honeycomb structures, a reinforcing layer was formed at a position one cell-pitch inside from the outer circumferential skin layer, and the isostatic strength was measured while changing the thickness of the reinforcing layer. The results were as shown in FIG. 12B.

The isostatic strength was measured in the manner described below. That is, a 1-mm thick urethane sheet and a 20-mm thick aluminum plate were brought into contact with both end surfaces of the honeycomb structure which was then sealed with a 1-mm thick rubber tube. Then, a hydrostatic pressure was applied thereto to measure the pressure at the time of breakage.

Figure 12B:
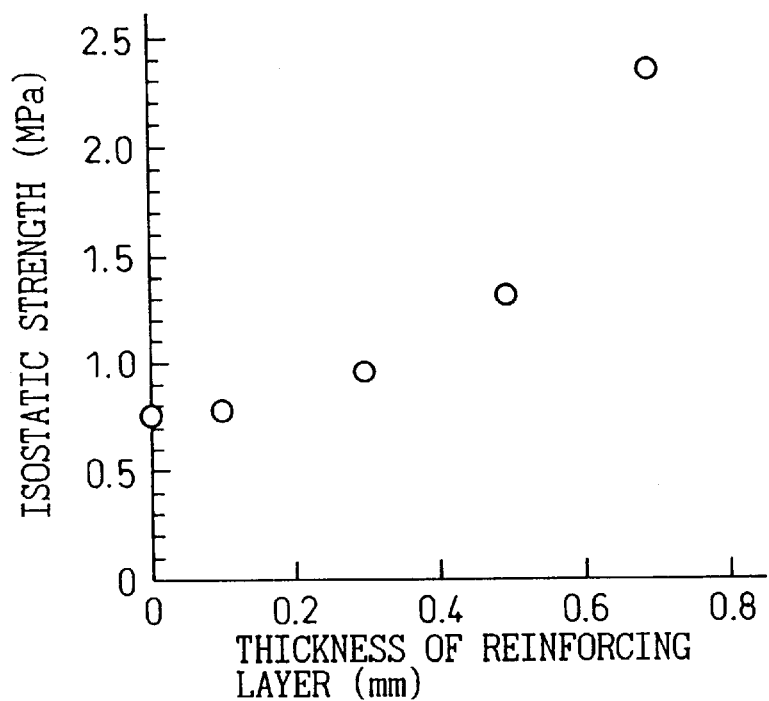
FIG. 12B is a diagram illustrating a relationship between the thickness of the reinforcing layer and the isostatic strength.

It will be understood from FIGS. 12A and 12B that the isostatic strength increases with an increase in the number of the reinforcing layers or with an increase in the thickness of the reinforcing layer.

Figure 13A:
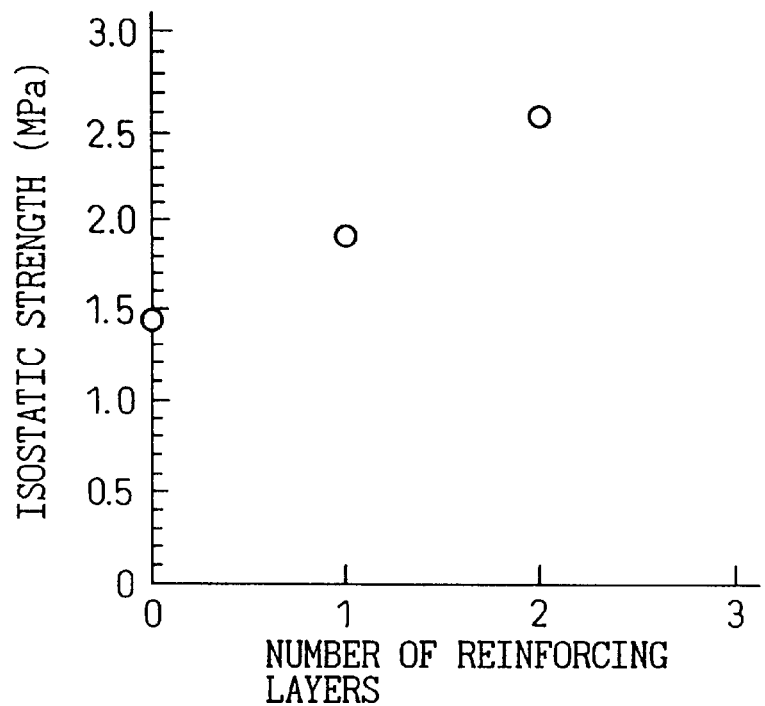
FIG. 13A is a diagram illustrating a relationship between the number of the reinforcing layers and the isostatic strength.
Figure 13B:
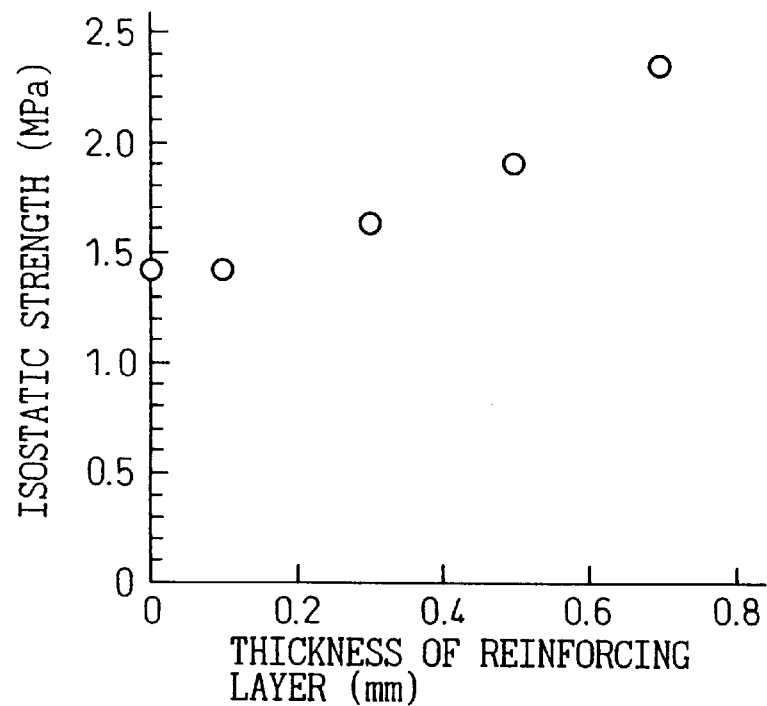
FIG. 13B is a diagram illustrating a relationship between the thickness of the reinforcing layer and the isostatic strength.

The isostatic strength was further measured by increasing the thickness of the cell walls along the outer circumferential edge in addition to employing the constitutions of FIGS. 12A and 12B. The results were as shown in FIGS. 13A and 13B. Here, the thick cell walls were formed for the cells more than two cell-pitches from the outer circumferential edge, the thick walls having a thickness of 110 μm. It will be understood from FIGS. 13A and 13B that when the thick cell walls are formed along the outer circumferential edge, too, the isostatic strength increases with an increase in the number of the reinforcing layers or with an increase in the thickness of the reinforcing layer.

Ceramic honeycomb structures having a diameter of 100 mm, a length of 155 mm, a cell wall thickness of 75 μm, a cell-pitch of 1.27 mm and an outer circumferential skin layer thickness of 0.7 mm were prepared in the same manner as the one described above, and the thermal shock resistance was evaluated while changing the number and thickness of the reinforcing layers as shown in Table 1. The reinforcing layer was formed at a position one cell-pitch pitch from the outer circumferential skin layer in a manner to not pass through the lattice points of the cells of the outermost circumference within ranges of from −4 degrees to +4 degrees with respect to the diagonal lines from the center point of the cross section of the structure. First, an electric furnace was stably maintained at a predetermined temperature (room temperature+difference in the preset temperature), the honeycomb structure was introduced into the furnace, maintained therein for 20 minutes, taken out from the furnace, and was examined for the presence of cracks. The results were as shown in Table 1.

TABLE 1

| Sample | Thickness of reinforcing layer | Number of reinforcing layers | Temperature at break by thermal shock |
| --- | --- | --- | --- |
| Example 1 | 0.3 mm | 1 | 900° C. |
| Example 2 | 0.5 mm | 1 | 890° C. |
| Example 3 | 0.5 mm | 2 | 860° C. |
| Comp. Ex. | — | — | 830° C. |

As a comparative example, conventional honeycomb structures having the same cell wall thickness of 110 $\mu$m with no reinforcing layer, were evaluated in the same manner as described above. The results were as shown in Table 1 from which it will be obvious that the provision of the reinforcing layer improves the thermal shock resistance.

What is claimed is:

1. A ceramic honeycomb structure comprising:

an outer circumferential skin layer of nearly a cylindrical shape;

partitioning walls defining a number of cells which extend in the axial direction of the ceramic honeycomb structure in said outer circumferential skin layer; and at least one reinforcing layer of nearly a cylindrical shape formed near the inside of said outer circumferential skin layer but being spaced apart therefrom and extending from one end of the ceramic honeycomb structure toward the other end thereof; wherein said outer circumferential skin layer, said partitioning walls and said at least one reinforcing layer are integrally made of the same material, and the thickness of said partitioning walls is not larger than 100 $\mu$m in the areas from the central portion of the ceramic honeycomb structure to the vicinity of said reinforcing layer.

2. The ceramic honeycomb structure according to claim 1, wherein said at least one reinforcing layer includes a plurality of nearly cylindrical layers which are arranged in concentric with said outer circumferential skin layer and are spaced apart from each other.

3. The ceramic honeycomb structure according to claim 1, wherein the partitioning walls of the honeycomb structure along the outer circumferential edge have a thickness larger than a thickness of the partitioning walls in the central portions.

4. The ceramic honeycomb structure according to claim 2, wherein the reinforcing layer of said at least one reinforcing layer closest to the outer circumferential skin layer is arranged within one-cell pitch from said outer circumferential skin layer.

5. The ceramic honeycomb structure according to claim 1, wherein said cells have a polygonal shape in cross section, and said at least one reinforcing layer does not pass through the lattice points of the cells of the outermost circumference within ranges of from −4° to +4° with respect to radial lines extending from almost the center point of the ceramic honeycomb structure having a circular shape in cross section, toward the directions of diagonal lines of the polygonal cells.

6. The ceramic honeycomb structure according to claim 5, wherein said reinforcing layer does not pass through the lattice points of the cells more than two cell-pitches from the outermost circumference within said ranges of from −4° to +4°.

* * * * *